(12) United States Patent
Platel et al.

(10) Patent No.: US 10,065,889 B2
(45) Date of Patent: Sep. 4, 2018

(54) POLY(ETHYLENE GLYCOL) GEMINAL ESTER PHOSPHATE, USE AS ADDITIVE IN HYDRAULIC COMPOSITIONS AND COMPOSITIONS CONTAINING SAME

(71) Applicant: COATEX, Genay (FR)

(72) Inventors: David Platel, Saint Maurice de Gourdans (FR); Jean-Marc Suau, Lucenay (FR)

(73) Assignee: COATEX, Genay (FR)

( * ) Notice: Subject to any disclaimer, the term of this patent is extended or adjusted under 35 U.S.C. 154(b) by 402 days.

(21) Appl. No.: 14/909,640

(22) PCT Filed: Aug. 1, 2014

(86) PCT No.: PCT/FR2014/052009
§ 371 (c)(1),
(2) Date: Feb. 2, 2016

(87) PCT Pub. No.: WO2015/019006
PCT Pub. Date: Feb. 12, 2015

(65) Prior Publication Data
US 2016/0176759 A1   Jun. 23, 2016

(30) Foreign Application Priority Data

Aug. 8, 2013 (FR) ...................... 13 57874

(51) Int. Cl.
| C04B 24/24 | (2006.01) |
| --- | --- |
| C04B 28/02 | (2006.01) |
| C04B 40/00 | (2006.01) |
| C08G 65/327 | (2006.01) |
| C08G 65/333 | (2006.01) |
| C08L 71/02 | (2006.01) |
| C04B 103/30 | (2006.01) |
| C04B 103/32 | (2006.01) |

(52) U.S. Cl.
CPC ............ *C04B 24/243* (2013.01); *C04B 28/02* (2013.01); *C04B 40/0039* (2013.01); *C08G 65/327* (2013.01); *C08G 65/333* (2013.01); *C08L 71/02* (2013.01); *C04B 2103/308* (2013.01); *C04B 2103/32* (2013.01); *C08G 2650/30* (2013.01)

(58) Field of Classification Search
CPC ..... C04B 14/06; C04B 14/28; C04B 20/0076; C04B 20/008; C04B 24/243; C04B 28/02; C04B 2103/308; C04B 2103/12; C04B 2103/22; C04B 2103/44; C04B 2103/50; C08G 65/327; C08G 65/333; C08G 2650/30; C08L 71/02
See application file for complete search history.

(56) References Cited

U.S. PATENT DOCUMENTS

| 4,395,373 A | 7/1983 | Login et al. |
| --- | --- | --- |
| 6,133,347 A | 10/2000 | Vickers, Jr. et al. |
| 6,309,457 B1 | 10/2001 | Guerinet et al. |
| 6,451,881 B1 | 9/2002 | Vickers, Jr. et al. |
| 6,492,461 B1 | 12/2002 | Vickers, Jr. et al. |
| 2011/0281975 A1 | 11/2011 | Kraus et al. |
| 2012/0059090 A1 | 3/2012 | Seurre et al. |
| 2014/0039098 A1 | 2/2014 | Chougrani et al. |
| 2014/0353551 A1 | 12/2014 | Dengler et al. |

FOREIGN PATENT DOCUMENTS

| EP | 2 615 073 A1 | 7/2013 |
| --- | --- | --- |
| FR | 2 763 065 A1 | 11/1998 |
| FR | 2 943 053 A1 | 9/2010 |
| WO | 2010/040611 A1 | 4/2010 |
| WO | 2012/140235 A1 | 10/2012 |

OTHER PUBLICATIONS

International Search Report dated Dec. 4, 2014 in PCT/FR2014/052009 filed Aug. 1, 2014.

*Primary Examiner* — Anthony J Green
(74) *Attorney, Agent, or Firm* — Oblon, McClelland, Maier & Neustadt, L.L.P.

(57) ABSTRACT

The present invention relates to the technical field of hydraulic compositions, for example concrete and mortar compositions. More specifically, the present patent application relates to additives used in hydraulic compositions, to the compositions containing same, and also to the method for preparing these additives and to the various uses thereof.

14 Claims, No Drawings

POLY(ETHYLENE GLYCOL) GEMINAL ESTER PHOSPHATE, USE AS ADDITIVE IN HYDRAULIC COMPOSITIONS AND COMPOSITIONS CONTAINING SAME

FIELD OF THE INVENTION

The present invention relates to the technical field of hydraulic compositions, for example concrete and mortar compositions. Such compositions are intended for all markets in the area of construction. More precisely, the present patent application relates to additives used in said hydraulic compositions.

BACKGROUND OF THE INVENTION

Hydraulic compositions generally comprise various chemical additives that are intended to improve their properties. Among these, generally a chemical agent is used that has the function of improving the state of dispersion of the mineral particles within the composition. This chemical agent is known by various names: "dispersant", "liquefying agent", "water reducing agent", "plasticizer" or "superplasticizer". This chemical agent makes it possible to lower the water content of hydraulic compositions, for improving the performance of hydraulic compositions, including mechanical strength. Other additives (for example setting retarders or accelerators) are optionally added in parallel in the hydraulic compositions.

There is a great variety of dispersants for hydraulic compositions. These agents vary in their chemical composition and the properties that they induce in the compositions containing them.

The dispersing properties of a dispersant in a hydraulic composition are evaluated by measuring the slump, also called workability, according to standard EN 12350-2. The workability of a concrete is an important property, which governs its placement for filling the formwork.

It is evaluated just after it is prepared, as well as at specified times after preparation, making it possible to evaluate the workability over time, also called slump retention, as well as the maximum duration of workability after preparation. It will easily be understood that there is an advantage in increasing the workability of a concrete for placement, as well as an advantage in modulating the slump retention of hydraulic compositions, for example to guarantee a workability for a long period (which notably allows the placement in the formwork to be adjusted).

Moreover, although it is important to prolong the period of workability of a concrete, this must not be done to the detriment of the performance of the concrete during hardening or in the hardened state (notably the required initial or final mechanical strength), or of the level of air entrained in the hydraulic compositions. Notably, the performance of concrete in the hardened state is evaluated by measuring the compressive strength at different times (1, 3, 7 and 28 days).

A certain number of documents of the prior art describe the use of dispersant compounds based on sulfonate functions —$SO_2O^-$. The inadequate efficacy of such products quickly led the person skilled in the art to develop new structures known by the name of comb polymers.

Other documents of the prior art in fact describe the use of comb copolymers as dispersants in hydraulic compositions. We may notably mention documents WO 02/083594, WO 2004/094336, U.S. Pat. No. 7,261,772, US 2008/087198 and WO 2006/138017. The comb copolymers are synthetic copolymers with an anionic charge on the skeleton and uncharged side chains. The side chains of the anionically charged comb polymer may comprise compounds containing a polymerized epoxide, for example an ethylene oxide, a propylene oxide and/or a 1-butylene oxide.

Documents US 2008/087198 and U.S. Pat. No. 7,261,772 propose using an amide jointly with said comb copolymers, this combination being presented as effective for dispersing mineral matter with impurities.

As for document WO 98/58887, it proposes doping the efficacy of comb polymers in cement matrixes containing clays, using organic or inorganic cations and quaternary (poly)amines, optionally alkoxylated.

As for document FR 2 887 542, it recommends employing a particular cationic polymer to neutralize the harmful effects of the clays contained in certain sands.

Document FR 2 759 704 describes the use of alkylene polyoxide compounds for dispersing carbon black, an organic material that is amorphous, hydrophobic and not electrically charged, different from the mineral fillers of the calcium carbonate type.

Document WO 97/19748 describes the use of a dispersant for dispersing pigment particles in the paint application. This agent consists of a poly(oxyethylated) and poly(oxypropylated) phosphate ester.

Documents FR 2 696 736, FR 2 943 053, FR 2 810 314, FR 2 763 065, WO 2012/140235 and WO 2013/093344 describe the use of compounds bearing a polyalkoxylated chain and one or two phosphonic amino-methylene groups as liquefying agents (or rheology extenders) for aqueous suspensions of mineral particles. Such compounds are available commercially. As an example, we may mention the products CHRYSO®Fluid in the Optima range (for example Optima 100 and Optima 175).

The article by Pourchet et al. (Influence of three types of superplasticizers on tricalciumaluminate hydration in presence of gypsum in International Conference on Superplasticizers and other chemical admixtures in concrete, Sorrento: Italy, 2006) studies the influence of the chemical structure of various superplasticizers, notably a poly(oxyethylene) diphosphonate polymer, on the hydration of cement.

The inventors realized that the performances of hydraulic compositions, evaluated by the workability of said freshly prepared composition and by the compressive strength of said composition in the hardened state, could be improved relative to the commercially available products of the alkoxylated diphosphonate type, by using a particular chemical additive, namely a polyethylene glycol geminal ester phosphate according to the invention.

BRIEF DESCRIPTION OF THE INVENTION

An object of the present invention is to propose an additive for hydraulic compositions that gives excellent workability after preparation, as well as an improvement in retention of workability over time, for example after a period of 45 minutes of storage and then remixing.

Another object of the present invention is to propose an additive for hydraulic compositions giving very good compressive strength one day after placement.

Another object of the present invention is to propose an additive for hydraulic compositions that gives, simultaneously, retention of workability and a quick increase in strength of the material.

The present invention thus relates to a chemical additive for hydraulic compositions, said additive endowing this suspension with excellent workability after preparation, as well as after a specified storage time (for example 45 minutes or more), as measured by the slump test, without lowering the compressive strength value of the material obtained one day after placement. This additive consists of a polyethylene glycol geminal mono- and diester phosphate.

The comparative tests presented in the experimental section of the present application in fact demonstrate the superiority of the additives according to the present invention (workability and compressive strength) compared to products of the alkoxylated diphosphonate type, available commercially under the name CHRYSO®Fluid in the Optima range, notably the product Optima 100. Use of the additives according to the invention makes it possible to increase the compressive strengths at a young age (1 day) while ensuring an improvement in workability.

The additives according to the invention make it possible both to reduce the amount of water required for obtaining a workable hydraulic composition and to prolong the workability of the composition but without causing a large delay in setting.

DETAILED DESCRIPTION OF THE INVENTION

Additive

A first object of the present invention consists of an additive for hydraulic compositions, comprising a mixture of the compounds of the following formulas (I), (II) and (III):

with $n+m \geq 10$,
with $n_1+m_1 \geq 1$,
with $n_2+m_2 \geq 1$,
the group R is chosen from one or more of the elements H, $CH_3$, $C_2H_5$, $C_3H_7$, $C_4H_9$, $PO_3X_2$ or the group NYZ in which:
Y and Z may be identical or different,
Y represents $(EO)_{n3}$—$(PO)_{m3}$—$PO_3X_2$ or $(EO)_{n3}$—$(PO)_{m3}$—H,
Z represents $(EO)_{n4}$—$(PO)_{m4}$—$PO_3X_2$ or $(EO)_{n4}$—$(PO)_{m4}$—H,
$n_3$ and $n_4$, independently of one another, are integers which vary between 1 and 150 (inclusive) and
$m_3$ and $m_4$, independently of one another, are integers which vary between 0 and 150 (inclusive),
X represents H or M and
M represents a monovalent, divalent or trivalent cation.

The additive according to the invention consists of a mixture of poly(ethylene glycol) geminal ester phosphate compounds, in other words of polyethylene glycol compounds, optionally substituted, terminated at one end with a geminal group bearing at least one ester phosphate function. This geminal group may therefore be of the monoester phosphate or diester phosphate type. The "geminal diester phosphate" group is also called "gem-diphosphate" group and comprises two ester phosphates bound to one and the same nitrogen atom. The "geminal monoester phosphate"

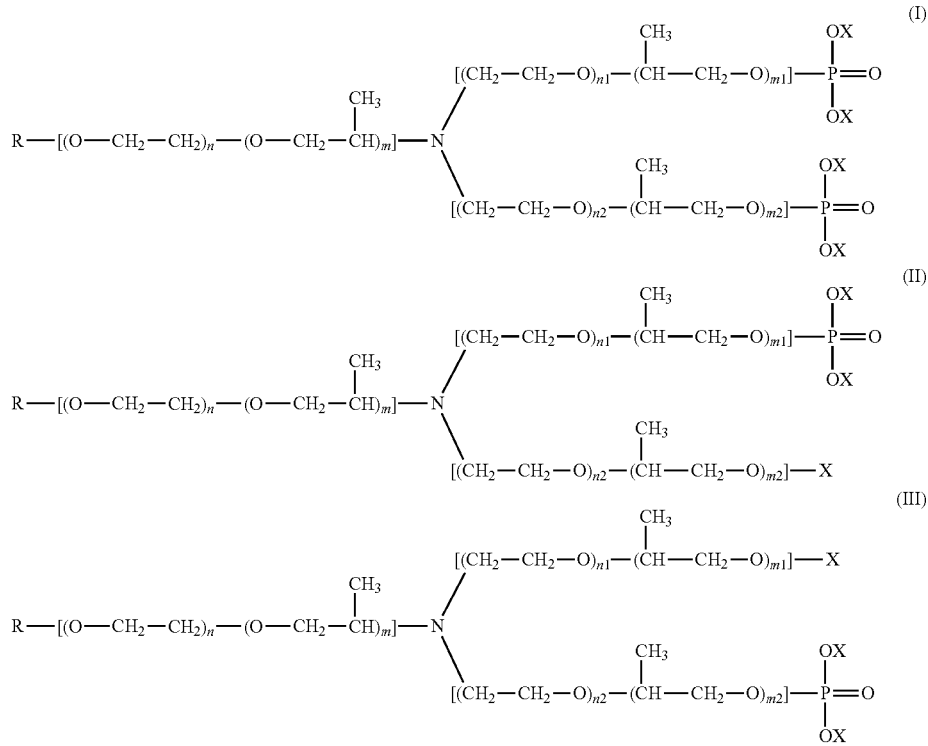

in which:
the groups ($CH_2$—$CH_2$—O) and ($CH_2$—$CH(CH_3)$—O) are arranged in blocks, alternately or randomly,
n, $n_1$ and $n_2$, independently of one another, are integers which vary between 1 and 150 (inclusive),
m, $m_1$ and $m_2$, independently of one another, are integers which vary between 0 and 150 (inclusive), group comprises an ester phosphate group and an oxyalkylated group, these two groups being bound to one and the same nitrogen atom. For all useful purposes, it should be noted that the "gem-diphosphate" group according to the invention is different from the "gem-bisphosphonate" group and the "phosphonic amino-methylene" group described in the prior art.

Thus, the compound of formula (I), a constituent of the additive according to the invention, is a poly(ethylene glycol) geminal diester phosphate compound, whereas the compounds of formulas (II) and (III), which may be identical or different, are poly(ethylene glycol) geminal monoester phosphate compounds.

It is noted, for all useful purposes, in the context of the present invention, that:

the groups represented by ($CH_2$—$CH_2$—O) or (O—$CH_2$—$CH_2$) are equivalent and may also be represented by (EO), also called ethylene oxide, the groups represented by ($CH_2$—$CH(CH_3)$—O) or (CH($CH_3$)—$CH_2$—O) or (O—$CH_2$—$CH(CH_3)$) or (O—$CH_2$—$CH(CH_3)$) are equivalent and may also be represented by (PO), also called propylene oxide, the groups EO and PO, arranged on either side of the nitrogen atom or constituting the group R in the compounds of the present invention, are arranged in blocks, alternately or randomly. Thus, as an example, the polyalkylene glycol chains may consist of PO groups inserted in the middle of a cluster of EO groups or alternately the polyalkylene glycol chains may consist of a series with a specified number of PO groups and then a specified number of EO groups.

The additive according to the invention, or the mixture of compounds of formulas (I), (II) and (III), may be in the form of salts, stoichiometric or not, mixed or not, and may be constituted with alkali metals, alkaline-earth metals, amines or quaternary ammoniums. According to one embodiment, the additive according to the invention is in acidic form.

According to another embodiment, the additive according to the invention is in neutralized form.

According to yet another embodiment, the additive according to the invention is in the partially or completely neutralized form.

When it is in the form of salts, the additive according to the invention may notably be a calcium salt, a sodium salt or a diethanolamine salt.

According to one embodiment, the additive according to the invention is such that M is chosen from the group consisting of the potassium ion, sodium ion, lithium ion, calcium ion, magnesium ion, ammonium ion and a mixture of these ions.

The additive according to the invention may be in liquid form or in solid form, for example it may be supported on a suitable support, of the mineral type (silica, fumed silica, $CaCO_3$ etc.).

The additive according to the invention may be water-soluble or water-dispersible.

According to one embodiment, the additive according to the invention is such that, in formulas (I), (II) and (III), $n_1+m_1 \leq 10$ and $n_2+m_2 \leq 10$.

According to another embodiment, the additive according to the invention is such that, in formulas (I), (II) and (III), $n_1$ and $n_2$ are equal to 1 and $m_1$ and $m_2$ are equal to 0.

According to yet another embodiment, the additive according to the invention is such that, in formulas (I), (II) and (III), R represents $CH_3$.

According to one embodiment, the additive according to the invention is such that, in formulas (I), (II) and (III), n varies between 10 and 120 (inclusive).

According to another embodiment, the additive according to the invention is such that, in formulas (I), (II) and (III), n varies between 20 and 80 (inclusive).

According to one embodiment, group R in the compounds of formulas (I), (II) or (III) may represent a linear or branched carbon chain that comprises between 1 and 4 carbon atoms (inclusive). "Branched" is to be understood, as opposed to a linear chain, as a carbon chain that comprises at least one substituent group on the side.

According to one embodiment, the present invention relates to an additive for hydraulic compositions, comprising a mixture of the compounds of the following formulas (IV), (V) and (VI):

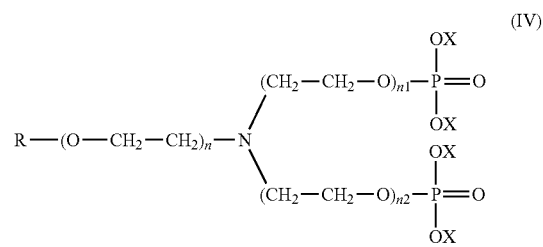

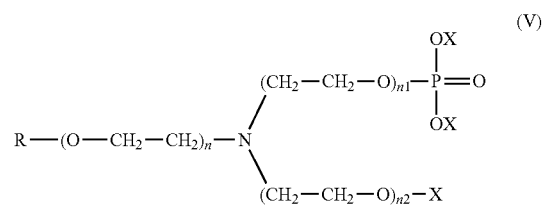

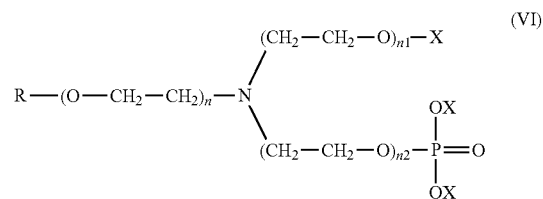

in which R, n, $n_1$, $n_2$ and X are as defined above.

According to another embodiment, the present invention relates to an additive for hydraulic compositions, comprising a mixture of the compounds of the following formulas (VII) and (VIII):

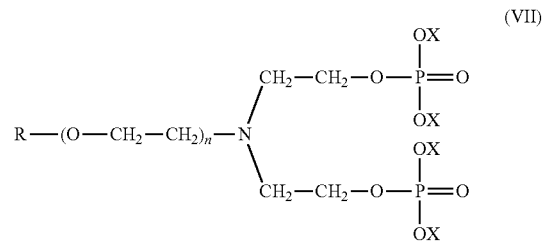

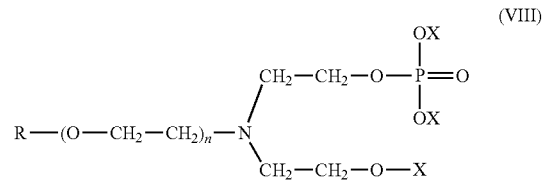

in which R, n and X are as defined above.

The additive of formula (VII) may also be represented by the additive of the following formula (VII'):

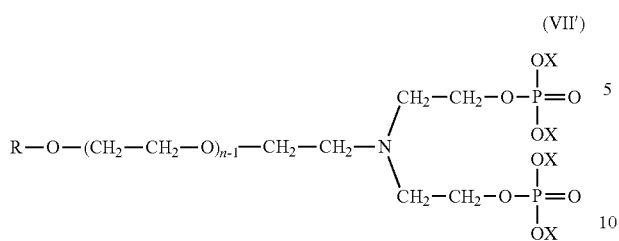

(VII')

in which R, n and X are as defined above.

The additive of formula (VIII) may also be represented by the additive of the following formula (VIII'):

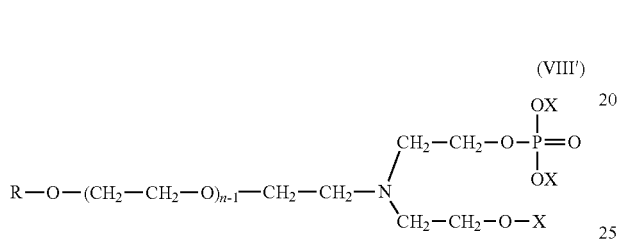

(VIII')

in which R, n and X are as defined above.

According to another embodiment, the present invention relates to an additive for hydraulic compositions, comprising a mixture of the compounds of the following formulas (IX), (X), (XI), (XII) and (XIII)

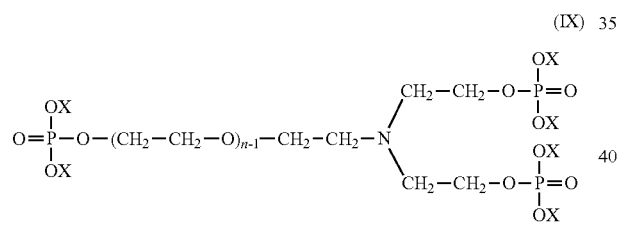

(IX)

-continued

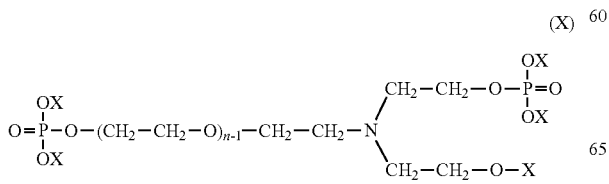

(X)

(XI)

(XII)

(XIII)

in which R, n and X are as defined above.

According to this embodiment, the additive according to the invention comprises a mixture of triphosphate, diphosphate and monophosphate compounds.

According to one embodiment of the present invention, the additive for hydraulic compositions further comprises a compound of formula (XIX):

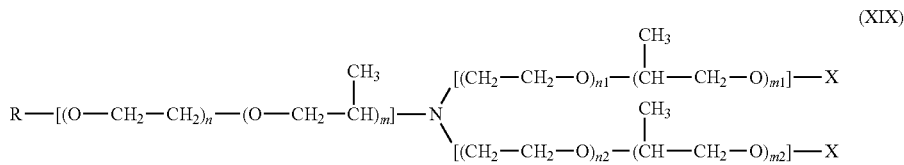

(XIX)

According to one embodiment, the additive for hydraulic compositions further comprises a compound of formula (XIX) in an amount less than 1% by weight.

According to one embodiment, the additive according to the present invention further comprises compounds (I'), (II') and (III'), of formulas identical to compounds (I), (II) and (III) respectively, the only difference being that the group X of each of the ester-phosphate functions represents H, the cation M or a compound of formula (I), (II) or (III), bound to the compound by one of the hydroxyl functions of the chain $-(CH_2-CH_2-O)_{n1}-(CH_2-CH_2(-CH_3)-O)_{m1}$ or —(CH$_2$—CH$_2$—O)$_{n2}$—(CH$_2$—CH$_2$(—CH$_3$)—O)$_{m2}$. Thus, according to this embodiment, each phosphate of each ester phosphate function is able to form two additional ester phosphate bonds.

According to one embodiment, the additive according to the present invention further comprises compounds (IV'), (V') and (VI'), of formulas identical to compounds (IV), (V) and (VI) respectively, the only difference being that the group X of each of the ester-phosphate functions represents H, the cation M or a compound of formula (IV), (V) or (VI), bound to the compound by one of the hydroxyl functions of the chain —(CH$_2$—CH$_2$—O)$_{n1}$ or —(CH$_2$—CH$_2$—O)$_{n2}$. Thus, according to this embodiment, each phosphate of each ester phosphate function is able to form two additional ester phosphate bonds.

According to one embodiment, the additive according to the present invention further comprises compounds (VII") and (VIII"), of formulas identical to compounds (VII) and (VIII) respectively, the only difference being that the group X of each of the ester-phosphate functions represents H, the cation M or a compound of formula (VII) or (VIII), bound to the compound by one of its hydroxyl functions of the ethoxylated chain. Thus, according to this embodiment, each phosphate of each ester phosphate function is able to form two additional ester phosphate bonds. Thus, compound (VII") may form up to 4 additional ester phosphate bonds and compound (VIII") may form up to 2 additional ester phosphate bonds.

Hydraulic Composition

In the context of the present invention, a hydraulic composition is an aqueous formulation containing water, at least one hydraulic binder and at least one additive according to the invention. The hydraulic binder comprises at least one cement, for example a Portland cement. We may also mention, for all useful purposes, the hydraulic binders of the calcium aluminate cement and calcium sulfo-aluminate cement type.

The dosage of the additive according to the invention mainly depends on the amount of hydraulic binders in the hydraulic composition. Most often, it is expressed in dry matter of additive relative to the total weight of the hydraulic binder (for example cement in concrete and mortar compositions).

According to one embodiment of the present invention, said hydraulic composition comprises from 0.05% to 5% by dry weight of said additive relative to the dry weight of cement.

According to another embodiment of the present invention, said hydraulic composition comprises, expressed in percentage by dry weight of said additive relative to the dry weight of cement, from 0.1% to 3% of said additive.

This hydraulic composition is, for example, intended for making a grout, a putty, an adhesive, a concrete or a mortar. This composition may comprise impurities, for example clays. This composition may notably comprise latices, fibers, organic granules, inorganic granules, fillers and/or CaCO$_3$.

The hydraulic compositions, for example the concrete and mortar compositions, for which the additive according to the invention may be useful, may comprise various types of cements as hydraulic binder, such as the cements CEM I, CEM II, CEM III, CEM V as described in standard EN 197-1. Among the latter, the cements CEM I do not comprise any additive. It is, however, possible to add slags, fly-ash, limestone fillers and/or siliceous fillers to these cements. The concrete compositions may be concretes of different strength grades, such as C20/25 to C100/115.

According to one embodiment, the hydraulic composition according to the invention comprises from 10 to 90% by weight of hydraulic binder.

According to one embodiment, the hydraulic composition according to the invention comprises, relative to the total weight of the composition:
from 2 to 15% by weight of water,
from 10 to 30% by weight of hydraulic binder comprising a cement and
from 0.05 to 3% by weight of said at least one additive.

According to this embodiment, the hydraulic composition according to the invention may also further comprise from 10 to 60% by weight of sand.

According to one embodiment, the hydraulic composition according to the invention comprises, relative to the total weight of the composition:
from 2 to 15% by weight of water,
from 10 to 30% by weight of hydraulic binder comprising a cement,
from 0.05 to 3% by weight of said at least one additive,
from 10 to 60% by weight of sand and
from 10 to 60% by weight of one or more gravels.

The hydraulic composition according to the invention may, moreover, comprise one or more of the following ingredients:
sand,
gravels,
granules,
fine or ultrafine fillers, for example calcium carbonate or silica,
antifoaming agent,
thickener,
stabilizer,
biocide or antibacterial agent,
pH modifier and
setting accelerator or retarder.

Method of Manufacture of the Additive According to the Invention

Another object of the present invention consists of a method of manufacturing the additive for hydraulic compositions according to the invention, by reaction between an amine and epoxides.

More precisely, the method for preparing the additive according to the invention consists of a step of oxyalkylation of an amine compound and then a phosphatization step of the intermediate compound thus obtained.

The method of manufacturing of the additive according to the invention may be represented according to the following mechanism, in two, optionally three, steps:

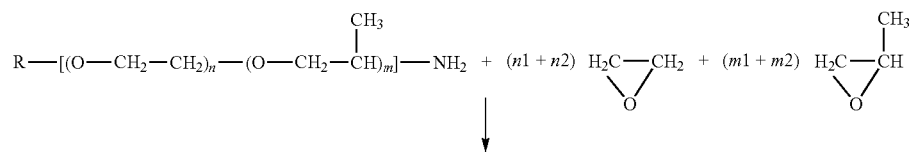

-continued

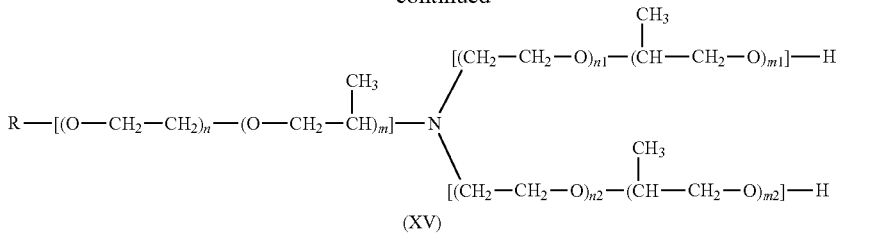
(XV)

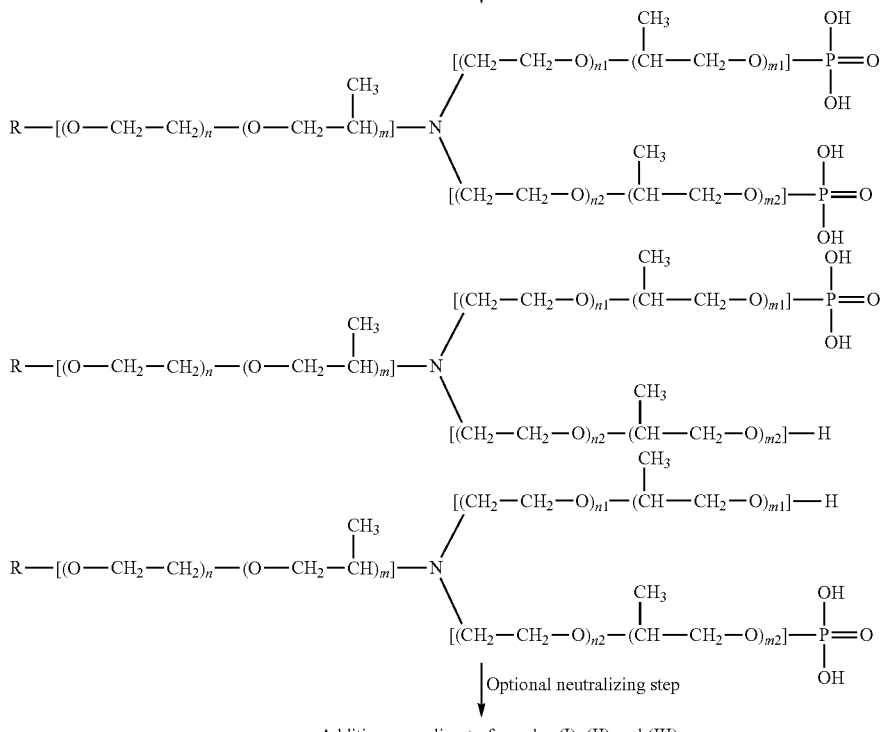

Additive according to formulas (I), (II) and (III)

with R, n, $n_1$, $n_2$, m, $m_1$ and $m_2$ as defined above.

According to a first step, oxyalkylation of the primary amine compound R—[(EO)$_n$—(PO)$_m$]—NH$_2$, in which R, n and m are as defined above, is carried out in the presence of ethylene oxide (C$_2$H$_4$O) and propylene oxide (C$_3$H$_7$O). This first step takes place in the presence of at least ($n_1$+$n_2$) moles of ethylene oxide and of at least ($m_1$+$m_2$) moles of propylene oxide. According to a second step, phosphatization of the intermediate compounds thus obtained is carried out. According to a third optional step, the mixture of phosphate compounds obtained is neutralized partially or completely.

Thus, the invention relates to a method for preparing an additive as defined above, comprising the following steps:

oxyalkylation of the compound of formula (XIV):

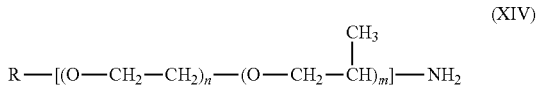
(XIV)

in the presence of at least ($n_1$+$n_2$) moles of ethylene oxide and at least ($m_1$+$m_2$) moles of propylene oxide per mole of compounds of formula (XIV), phosphatization of the intermediate compound of formula (XV):

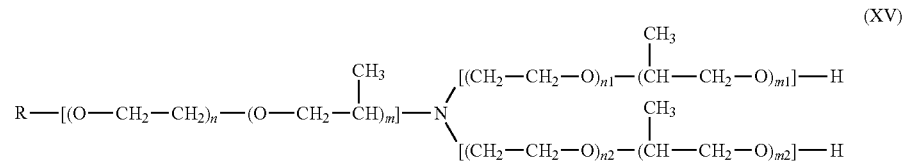
(XV)

in the presence of P$_2$O$_5$ and water and optionally, partial or complete neutralization of the phosphate compound thus obtained, so as to obtain an additive comprising a mixture of the compounds of formulas (I), (II) and (III).

According to one embodiment, the method of manufacturing of the additive according to the invention may be represented according to the following mechanism:

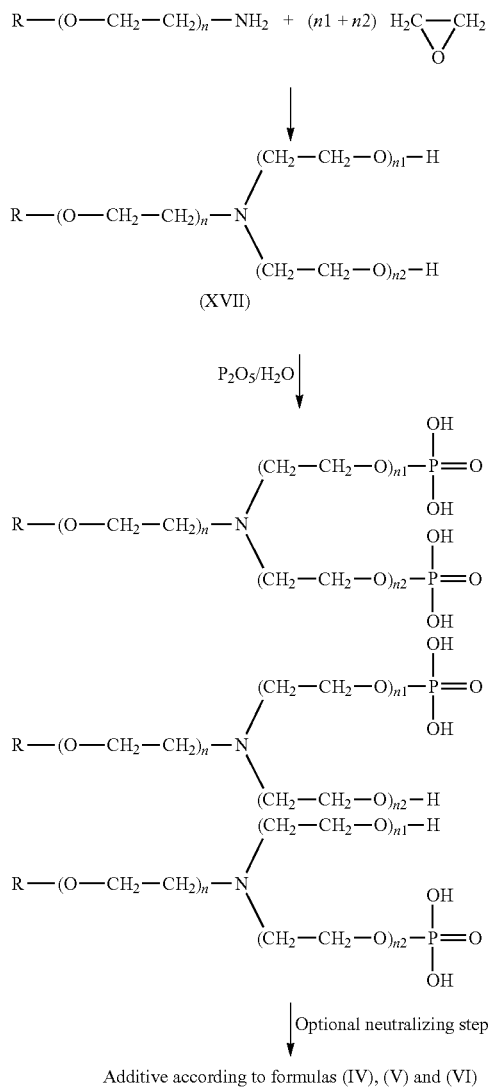

with R, n, n$_1$ and n$_2$ as defined above.

Thus, according to this embodiment, the method for preparing an additive according to formulas (IV), (V) and (VI) comprises the following steps:

oxyalkylation of the compound of formula (XVI):

R—(O—CH$_2$—CH$_2$)$_n$—NH$_2$      (XVI)

in the presence of at least (n$_1$+n$_2$) moles of ethylene oxide per mole of compounds of formula (XVI), phosphatization of the intermediate compound of formula (XVII):

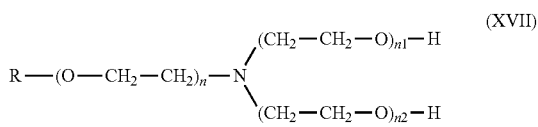

in the presence of P$_2$O$_5$ and water and optionally, partial or complete neutralization of the phosphate compound thus obtained, so as to obtain an additive comprising a mixture of the compounds of formulas (IV), (V) and (VI).

According to another embodiment, the method of manufacturing of an additive according to the invention may be represented according to the following mechanism:

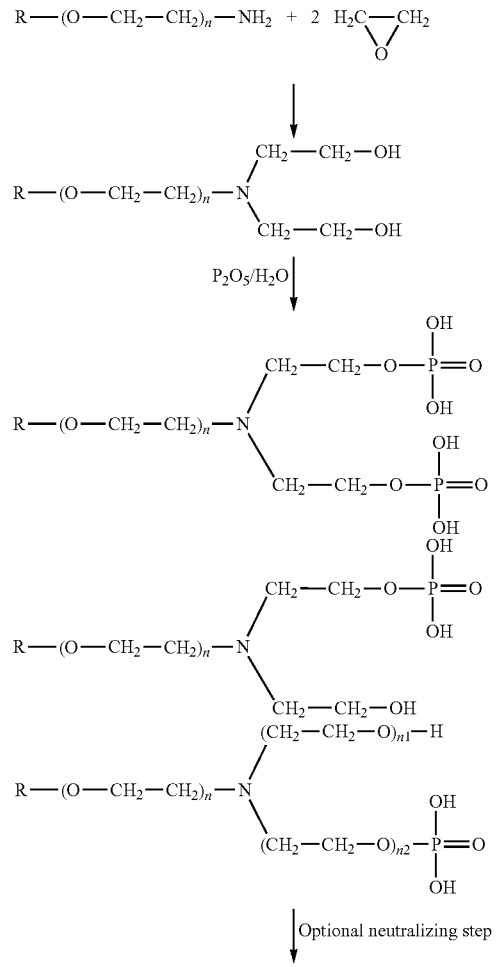

with R and n as defined above.

Thus, according to this embodiment, the method for preparing an additive according to formulas (VII) and (VIII) comprises the following steps:

oxyalkylation of the compound of formula (XVI):

R—(O—CH$_2$—CH$_2$)$_n$—NH$_2$      (XVI)

in the presence of at least 2 moles of ethylene oxide per mole of compounds of formula (XVI), phosphatization of the intermediate compound of formula (XVIII):

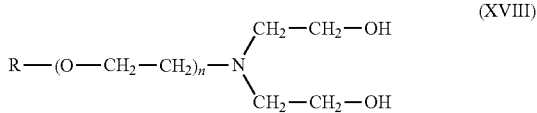

(XVIII)

in the presence of $P_2O_5$ and water and optionally, partial or complete neutralization of the phosphate compound thus obtained, so as to obtain an additive comprising a mixture of the compounds of formulas (VII) and (VIII).

According to one embodiment of the present invention, partial or complete neutralization is carried out before the phosphatization step.

Use of the Additive According to the Invention

One object of the present invention consists of using an additive as described above for preparing a hydraulic composition.

According to one embodiment, the use of this hydraulic composition additive makes it possible to improve the workability of the hydraulic composition containing it.

According to this use, said hydraulic composition comprises at least one hydraulic binder, for example a cement.

According to one embodiment, said composition is intended for preparing a concrete or a mortar.

Other Methods

The present invention also relates to a method for preparing a concrete, comprising a step consisting of adding a suitable amount of an additive for hydraulic compositions as described above.

The present invention also relates to a method of obtaining a hydraulic composition having a workability over time, said method comprising a step consisting of adding a suitable amount of an additive for hydraulic compositions as described above.

EXAMPLES

The following examples illustrate the preparation of various hydraulic compositions. Measurements of consistency, compressive strength and capture of air are performed on these compositions according to the following protocols.

Measurement of Workability (Slump)—Concrete

Measurements of workability, also called measurements of slump, are carried out at room temperature, by means of a cone without a base, of truncated shape, made of galvanized steel, called an Abrams cone, according to standard EN 12350-2. This cone has the following characteristics:

Top diameter: 100±2 mm,
Bottom diameter: 200±2 mm and
Height: 300±2 mm.

The cone is placed on a plate moistened with a sponge.

The cone is then filled with a specified amount of each of the preparations. Filling takes 2 minutes. The contents of the cone are tamped using a metal rod.

Measurement of Workability at T0

Immediately after filling, the cone is lifted vertically, which leads to slump of its contents on the plate.

The difference in height (in mm) between the top of the cone and the upper surface of the round disk thus constituted is measured after 30 seconds.

Measurement of Workability at T45

The concrete is left to rest for 45 minutes, the formulation is mixed again and then the workability is measured with the Abrams cone as described above.

The difference in height (in mm) between the top of the cone and the upper surface of the round disk thus constituted is measured after 30 seconds.

Measurement of the Capture of Air

Measurement of the capture of air is carried out according to standard EN 12350-7, paragraph 3.3.

Measurement of Compressive Strength

This is measured according to standard EN 12390-3, paragraph 3. The compressive strength is expressed in MPa.

Example 1

In each of the tests 1-1 to 1-4 given below, a mortar is prepared according to standard EN 196-1, by mixing with stirring: standardized sand (EN 196-1), cement (CEM 1 52.5 N), water and an additive outside the invention or according to the invention. The proportions are given in Table 1 below.

Tests 1-1 and 1-2 (Outside the Invention)

These tests use one and the same additive, outside the invention, present in the mortar composition at different concentrations (0.45% and 1.2% respectively).

This additive is based on poly(ethylene glycol) of molecular weight equal to 2,000 g/mol phosphatized in the presence of $P_2O_5/H_2O$ in the following conditions:

260 g of PEG 2000 are weighed in an 800-ml beaker,
it is heated with stirring and 18.5 g of $P_2O_5$ are added gradually in the space of about 30 minutes at a temperature of 70 (±5)° C.,
it is left to react for 3.5 h at 80 (±5)° C.,
it is diluted by adding 273 g of water and
it is neutralized completely with sodium by adding 32.7 g of NaOH (50%).

The additive is obtained in the form of a concentrated liquid (pH=7.5) with a dry extract of 50.3%.

Test 1-3 (Outside the Invention)

This test uses a dispersant outside the invention.

This agent is based on poly(ethylene glycol) of molecular weight equal to 5,500 g/mol phosphatized in the presence of $P_2O_5/H_2O$ in conditions similar to those of tests 1-1 and 1-2.

The additive is obtained in the form of a concentrated liquid (pH=7) with a dry extract of 41.5%.

Test 1-4 (According to the Invention)

This test illustrates the invention and uses an additive comprising a mixture of compounds of formulas (I), (II) and (III) in which:

m, $m_1$ and $m_2$ are equal to 0,
n=45,
$n_1$ and $n_2$ are equal to 1,
R represents $CH_3$ and
X represents H.

This additive was obtained as follows:

310 g of compounds of the following formula are weighed in an 800-ml beaker:

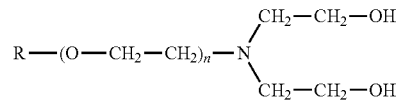

in which R represents $CH_3$ and n=45,
it is heated with stirring and 22 g of $P_2O_5$ are added gradually in the space of about 30 minutes at a temperature of 45 (±2)° C.,
it is left to react for 4 h at 55 (±5)° C.,
it is diluted by adding 310 g of water and it is neutralized completely with sodium by adding 13.8 g of NaOH (50%).

The additive is obtained in the form of a concentrated liquid (pH=7.4) with a dry extract of 53%.

TABLE 1

|  | Test | | | |
| --- | --- | --- | --- | --- |
|  | 1-1 Outside INV | 1-2 Outside INV | 1-3 Outside INV | 1-4 Invention |
| Sand (g) | 2,700 | 2,700 | 2,700 | 2,700 |
| Cement (g) | 900 | 900 | 900 | 900 |
| Additive as is (g) | 8.05 | 21.47 | 10 | 7.6 |
| Water (g) | 435 | 435 | 435 | 435 |
| % dry additive/cement | 0.45 | 1.20 | 0.45 | 0.45 |

The workability is measured at T0 using the test described above adapted to mortar (mini-Abrams cone) and the capture of air of each of the mortar preparations is measured. The results obtained are presented in Table 2 below.

TABLE 2

|  | Test | | | |
| --- | --- | --- | --- | --- |
|  | 1-1 Outside NV | 1-2 Outside NV | 1-3 Outside NV | 1-4 Invention |
| Workability T0 (mm) | 100 | 175 | 140 | 270 |
| Capture of air (%) | 5.7 | 6.0 | 5.7 | 5.9 |

The best result is obtained with the additive according to the invention (test 1-4).

It gives a workability (or slump) at T0 greater than that of the mortars using an agent outside the invention (tests 1-1 to 1-3).

Example 2

In each of the tests 2-1 to 2-3 given below, a concrete is prepared according to standard EN 480-1, by mixing with stirring: standardized sand (0/4), cement (CEM I 52.5N Holcim), gravels 4/11 and 11/22, water and optionally an additive according to the prior art or according to the invention. The proportions are given in Table 3 below.

Test 2-1 (Control)

This test constitutes a control and does not use any dispersant.

Test 2-2 (Prior Art)

This test illustrates the prior art and uses a commercial product sold under the name CHRYSO®Fluid Optima 100.

The dry extract of this additive is 30%.

Test 2-3 (According to the Invention)

This test illustrates the invention and uses an additive comprising a mixture of compounds of formulas (I), (II) and (III) in which:

m, $m_1$ and $m_2$ are equal to 0, n=45, $n_1$ and $n_2$ are equal to 1,

R represents $CH_3$ and

X represents H.

The dry extract of this additive is 41%.

This additive was obtained according to a method similar to that in test 1-4.

TABLE 3

|  | Test | | |
| --- | --- | --- | --- |
|  | 2-1 Control | 2-2 Prior art | 2-3 Invention |
| Sand (kg) | 51.6 | 51.6 | 51.6 |
| Gravel 4/11 (kg) | 22.8 | 22.8 | 22.8 |
| Gravel 11/22 (kg) | 36.6 | 36.6 | 36.6 |
| Cement (kg) | 21 | 21 | 21 |
| Additive as is (kg) | — | 0.285 | 0.200 |
| Water (kg) | 13.850 | 10.388 | 10.388 |
| Water reduction |  | −25% | −25% |

The workability at T0 and at T45, the compressive strength on D1 and the capture of air of each of the concrete preparations are measured. The results obtained are presented in Table 4 below.

TABLE 4

|  | Test | | |
| --- | --- | --- | --- |
|  | 2-1 Control | 2-2 Prior art | 2-3 Invention |
| Workability T0 (mm) | 200 | 130 | 180 |
| Capture of air (%) | 1.8 | 4.5 | 3.9 |
| Workability T45 (mm) | 185 | 0 | 50 |
| Strength D1 (MPa) | 7.97 | 10.48 | 14.65 |

The best result is obtained with the additive according to the invention (test 2-3):

- it makes it possible to reduce the amount of water by 25% relative to the control (test 2-1),
- it makes it possible to reach a workability (or slump) at T0 greater than that of the composition using an additive according to the prior art (test 2-2),
- in addition, it makes it possible to obtain a capture of air (synonymous with zones of weakness in the concrete) lower than that of the composition using an additive according to the prior art (test 2-2),
- its workability at T45 is greater than that of the composition using an additive according to the prior art (test 2-2). Thus, the concrete has better slump retention relative to a concrete composition using an additive according to the prior art (test 2-2) and
- it makes it possible to obtain a strength at 24 h which is very significantly greater than that of the composition using an additive according to the prior art (test 2-2).

Example 3

In each of the tests 3-1 to 3-3 given below, a concrete is prepared according to standard EN 480-1, by mixing with stirring: standardized sand (0/4), cement (CEM I 52.5N Holcim), gravels 4/11 and 11/22, water and optionally an additive according to the prior art or according to the invention. The proportions are given in Table 5 below.

Test 3-1 (Control)

This test constitutes a control and does not use any dispersant.

Test 3-2 (Prior Art)

This test illustrates the prior art and uses a commercial product sold under the name CHRYSO®Fluid Optima 100.

The dry extract of this additive is 30%.

Test 3-3 (According to the Invention)

This test illustrates the invention and uses an additive comprising a mixture of compounds of formulas (I), (II) and (III) in which:

m, $m_1$ and $m_2$ are equal to 0,
n=45,
$n_1$ and $n_2$ are equal to 1,
R represents $CH_3$ and
X represents H.

The dry extract of this additive is 41%.

This additive was obtained according to a method similar to that in test 1-4.

TABLE 5

|  | Test | | |
|---|---|---|---|
|  | 3-1 Control | 3-2 Prior art | 3-3 Invention |
| Sand (kg) | 51.6 | 51.6 | 51.6 |
| Gravel 4/11 (kg) | 22.8 | 22.8 | 22.8 |
| Gravel 11/22 (kg) | 36.6 | 36.6 | 36.6 |
| Cement (kg) | 21 | 21 | 21 |
| Additive as is (kg) | — | 0.121 | 0.087 |
| % dry additive/cement | — | 0.17 | 0.17 |
| Water (kg) | 13.349 | 11.555 | 11.496 |
| Water reduction |  | −13.9% | −13.4% |

The workability at T0 and at T45, the compressive strength at D1 and the capture of air of each of the concrete preparations are measured. The results obtained are presented in Table 6 below.

TABLE 6

|  | Test | | |
|---|---|---|---|
|  | 3-1 Control | 3-2 Prior art | 3-3 Invention |
| Workability T0 (mm) | 195 | 180 | 195 |
| Capture of air (%) | 1.8 | 4.1 | 3.9 |
| Workability T45 (mm) | 110 | 0 | 100 |
| Strength D1 (mPa) | 6.99 | 9.43 | 10.89 |

The best result is obtained with the additive according to the invention (test 3-3):
- it makes it possible to reach a workability (or slump) at T0 greater than that of the composition using an additive according to the prior art (test 3-2),
- in addition, it makes it possible to obtain a capture of air (synonymous with zones of weakness in the concrete) lower than that of the composition using an additive according to the prior art (test 3-2),
- its workability at T45 is greater than that of the composition using an additive according to the prior art (test 3-2). Thus, the concrete has better slump retention relative to a concrete composition using an additive according to the prior art (test 3-2) and
- it makes it possible to obtain strength at D1 that is significantly greater than that of the composition using an additive according to the prior art (test 3-2).

The invention claimed is:

1. An additive for hydraulic compositions, the additive comprising a mixture of the compounds of the following formulas (I), (II) and (III):

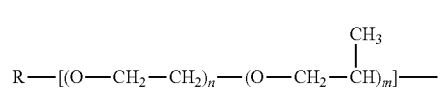

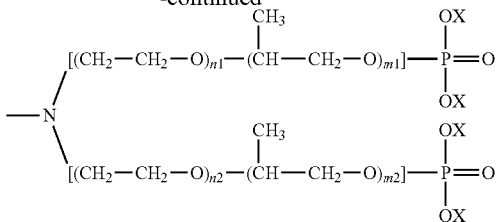

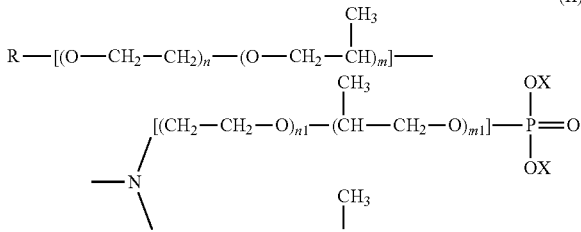

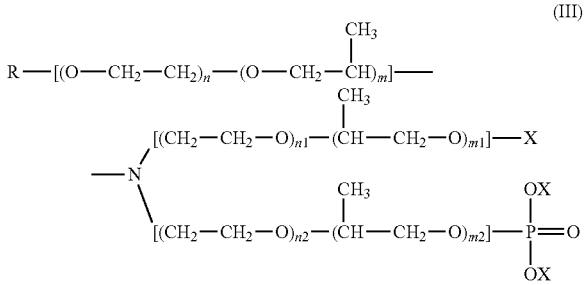

wherein:
the groups ($CH_2$—$CH_2$—O) and ($CH_2$—$CH(CH_3)$—O) are arranged in blocks, alternately or randomly,
n, $n_1$ and $n_2$, independently of one another, are integers which vary between 1 and 150 (inclusive),
m, $m_1$ and $m_2$, independently of one another, are integers which vary between 0 and 150 (inclusive),
with n +m ≥10,
with $n_1$ +$m_1$ ≥1,
with $n_2$ +$m_2$≥1,
the group R is at least one selected from the group consisting of H, $CH_3$, $C_2H_5$, $C_3H_7$, $C_4H_9$, $PO_3X_2$ and a group NYZ in which:
Y and Z may be identical or different,
Y represents $(EO)_{n3}$—$(PO)_{m3}$ —$PO_3X_2$ or $(EO)_{n3}$—$(PO)_{m3}$—H,
Z represents $(EO)_{n4}$—$(PO)_{m4}$—$PO_3X_2$ or $(EO)_{n4}$—$(PO)_{m4}$—H,
$n_3$ and $n_4$, independently of one another, are integers which vary between 1 and 150 (inclusive) and
$m_3$ and $m_4$, independently of one another, are integers which vary between 0 and 150 (inclusive),
X represents H or M and
M represents a monovalent, divalent or trivalent cation.

2. The additive of claim 1, wherein $n_1$ +$m_1$ ≤10 and $n_2$ +$m_2$ ≤10.

3. The additive of claim 1, wherein, in formulas (I), (II) and (III), $n_1$ and $n_2$ are equal to 1 and $m_1$ and $m_2$ are equal to 0.

4. The additive of claim 1, wherein, in formulas (I), (II) and (III), R represents $CH_3$.

5. The additive of claim 1, wherein M is selected from the group consisting of potassium ion, sodium ion, lithium ion, calcium ion, magnesium ion, ammonium ion and a mixture thereof.

6. The additive of claim 1, wherein, in formula (I), m is equal to 0.

7. The additive of claim 1, wherein, formula (I), n varies between 20 and 120 (inclusive).

8. A hydraulic composition, comprising:
water,
a hydraulic binder comprising a cement, and
at least one additive of claim 1.

9. The hydraulic composition according to claim 8, comprising, relative to a total weight of the composition:
from 2 to 15% by weight of the water,
from 10 to 30% by weight of the hydraulic binder, and
from 0.05 to 3% by weight of the at least one additive.

10. The hydraulic composition according to claim 9, further comprising from 10 to 60% by weight of sand.

11. The hydraulic composition of claim 8, comprising:
from 2 to 15% by weight of the water,
from 10 to 30% by weight of the hydraulic binder,
from 0.05 to 3% by weight of the at least one additive,
from 10 to 60% by weight of sand, and
from 10 to 60% by weight of one or more gravels.

12. A method for preparing the additive of claim 1, the method comprising
oxyalkylation of a compound of formula (XIV):

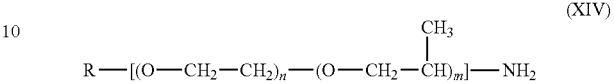

in the presence of at least $(n_1 + n_2)$ moles of ethylene oxide and at least $(m_1 + m_2)$ moles of propylene oxide per mole of the compound of formula (XIV),
phosphatization of an intermediate compound of formula (XV):

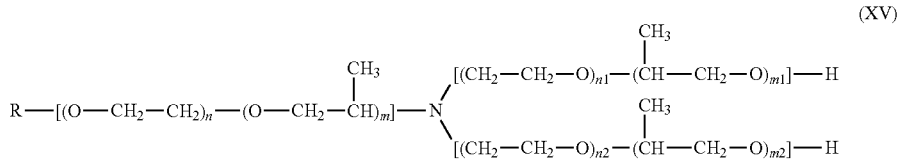

in the presence of $P_2O_5$ and water, and
optionally, partial or complete neutralization of a phosphate compound thus obtained, so as to obtain the additive comprising a mixture of the compounds of formulas (I), (II) and (III).

13. A hydraulic composition, comprising the additive of claim 1 in the form of a concrete or a mortar.

14. A method for preparing a hydraulic composition, the method consisting of adding the additive of claim 1 to a composition.

* * * * *